United States Patent
Leske (10) Patent No.: US 8,976,223 B1
(45) Date of Patent: Mar. 10, 2015

(54) SPEAKER SWITCHING IN MULTIWAY CONVERSATION

(71) Applicant: Google Inc., Mountain View, CA (US)

(72) Inventor: Matthew John Leske, Stockholm (SE)

(73) Assignee: Google Inc., Mountain View, CA (US)

( * ) Notice: Subject to any disclaimer, the term of this patent is extended or adjusted under 35 U.S.C. 154(b) by 153 days.

(21) Appl. No.: 13/724,351

(22) Filed: Dec. 21, 2012

(51) Int. Cl.
*H04N 7/14* (2006.01)
*H04N 7/15* (2006.01)

(52) U.S. Cl.
CPC ........................................ *H04N 7/15* (2013.01)
USPC ..................... 348/14.08; 345/473; 348/14.12; 348/207.1; 348/500; 370/260; 370/352; 375/240.2; 381/123; 382/299; 709/231; 709/232; 715/723

(58) Field of Classification Search
CPC ............. G06T 3/4053; H04N 21/2662; H04L 12/1827
USPC ......... 348/14.08, 14.12, 207.1, 500; 370/260, 370/352; 375/240.2; 382/299; 709/231, 709/232; 715/723; 345/473; 381/123
See application file for complete search history.

(56) References Cited

U.S. PATENT DOCUMENTS

| | | | |
|---|---|---|---|
| 6,211,869 B1 * | 4/2001 | Loveman et al. | 715/723 |
| 6,677,979 B1 * | 1/2004 | Westfield | 348/14.12 |
| 7,768,543 B2 | 8/2010 | Christiansen | |
| 7,930,419 B2 * | 4/2011 | Mullig et al. | 709/231 |
| 8,233,026 B2 * | 7/2012 | Sylvain | 348/14.08 |
| 8,483,098 B2 * | 7/2013 | Vadlakonda et al. | 370/260 |
| 8,495,236 B1 * | 7/2013 | Glasser | 709/231 |
| 8,631,143 B2 * | 1/2014 | Simonds | 709/231 |
| 8,743,963 B2 * | 6/2014 | Kanumuri et al. | 375/240.2 |
| 2002/0061143 A1 * | 5/2002 | Konoshima | 382/299 |
| 2006/0248210 A1 * | 11/2006 | Kenoyer | 709/231 |
| 2007/0143493 A1 * | 6/2007 | Mullig et al. | 709/232 |
| 2007/0291736 A1 * | 12/2007 | Furlong et al. | 370/352 |
| 2010/0149301 A1 * | 6/2010 | Lee et al. | 348/14.08 |
| 2010/0289904 A1 * | 11/2010 | Zhang et al. | 348/207.1 |
| 2010/0302346 A1 | 12/2010 | Huang et al. | |
| 2012/0189140 A1 * | 7/2012 | Hughes | 381/123 |
| 2013/0148023 A1 * | 6/2013 | Sullivan et al. | 348/500 |
| 2014/0125678 A1 * | 5/2014 | Wang et al. | 345/473 |

* cited by examiner

*Primary Examiner* — Gerald Gauthier
(74) *Attorney, Agent, or Firm* — Remarck Law Group PLC (57) ABSTRACT

A method, computer program product, and computer system for sending, by a first computing device, a video feed with a pre-determined quality level to a second computing device. The first computing device determines that a volume level associated with the video feed reaches a threshold. The first computing device sends the video feed with a higher quality level to the second computing device based upon, at least in part, determining that the volume level associated with the video feed reaches the threshold.

20 Claims, 5 Drawing Sheets

SPEAKER SWITCHING IN MULTIWAY CONVERSATION

BACKGROUND

Video conferencing systems (e.g., multiway video conferencing) may use scaling, layering or multicasting of real time video, such that the focal point of the video conference for a given user (e.g., the user that is speaking) may be on a larger image, while users that may not be speaking may be displayed in a smaller image. The video of the speaker in the larger image may be shown with higher quality video feed, whereas the non-speakers in the smaller images may be shown with lower quality video feed (e.g., to save on network and system resources). When a non-speaking user becomes a new speaking user and transitions from being shown in the smaller image (with the lower quality video feed) to the larger image (with the higher quality video feed), there may be a time delay (e.g., 3-4 seconds) between when the new speaking user is shown in the larger image and when the lower quality video feed finally switches to the higher quality video feed.

BRIEF SUMMARY OF DISCLOSURE

In one implementation, a method, performed by one or more computing devices, comprises sending, by a first computing device participating in a multiway video session, a video feed with a low resolution to a second computing device participating in the multiway video session. The first computing device determines that a volume level associated with the video feed reaches a threshold. The first computing device sends the video feed with a high resolution to the second computing device based upon, at least in part, determining that the volume level associated with the video feed reaches the threshold.

In one implementation, a method, performed by one or more computing devices, comprises sending, by a first computing device, a video feed with a pre-determined quality level to a second computing device. The first computing device determines that a volume level associated with the video feed reaches a threshold. The first computing device sends the video feed with a higher quality level to the second computing device based upon, at least in part, determining that the volume level associated with the video feed reaches the threshold.

One or more of the following features may be included. The first computing device may determine that the volume level associated with the video feed fails to reach the threshold. The video feed with the pre-determined quality level may be sent to the second computing device based upon, at least in part, determining that the volume level associated with the video feed fails to reach the threshold. The video feed with the pre-determined quality level may be sent to the second computing device based upon, at least in part, determining that the volume level associated with the video feed fails to reach the threshold after a length of time. The length of time may include a length of time that the volume level associated with the video feed reaches the threshold. The volume level associated with the video feed that reaches the threshold may be determined to be from speech. Whether to send the video feed with the higher quality level to the second computing device may be determined based upon, at least in part, a conversation classification associated with the video feed.

In another implementation, a computing system includes a processor and a memory configured to perform operations comprising sending, by a first computing device, a video feed with a pre-determined quality level to a second computing device. The first computing device determines that a volume level associated with the video feed reaches a threshold. The first computing device sends the video feed with a higher quality level to the second computing device based upon, at least in part, determining that the volume level associated with the video feed reaches the threshold.

One or more of the following features may be included. The first computing device may determine that the volume level associated with the video feed fails to reach the threshold. The video feed with the pre-determined quality level may be sent to the second computing device based upon, at least in part, determining that the volume level associated with the video feed fails to reach the threshold. The video feed with the pre-determined quality level may be sent to the second computing device based upon, at least in part, determining that the volume level associated with the video feed fails to reach the threshold after a length of time. The length of time may include a length of time that the volume level associated with the video feed reaches the threshold. The volume level associated with the video feed that reaches the threshold may be determined to be from speech. Whether to send the video feed with the higher quality level to the second computing device may be determined based upon, at least in part, a conversation classification associated with the video feed.

In another implementation, a computer program product resides on a computer readable storage medium that has a plurality of instructions stored on it. When executed by a processor, the instructions cause the processor to perform operations comprising sending, by a first computing device, a video feed with a pre-determined quality level to a second computing device. The first computing device determines that a volume level associated with the video feed reaches a threshold. The first computing device sends the video feed with a higher quality level to the second computing device based upon, at least in part, determining that the volume level associated with the video feed reaches the threshold.

One or more of the following features may be included. The first computing device may determine that the volume level associated with the video feed fails to reach the threshold. The video feed with the pre-determined quality level may be sent to the second computing device based upon, at least in part, determining that the volume level associated with the video feed fails to reach the threshold. The video feed with the pre-determined quality level may be sent to the second computing device based upon, at least in part, determining that the volume level associated with the video feed fails to reach the threshold after a length of time. The length of time may include a length of time that the volume level associated with the video feed reaches the threshold. The volume level associated with the video feed that reaches the threshold may be determined to be from speech. Whether to send the video feed with the higher quality level to the second computing device may be determined based upon, at least in part, a conversation classification associated with the video feed.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

In some implementations, video conferencing (e.g., multi-way video conferencing) may allow a focal point of the video conference for a given user (e.g., the user that is speaking) to be on a larger image, while users that may not be speaking may be displayed in a smaller image. In some implementations, the video of the speaker in the larger image may be shown with higher quality video feed, whereas the non-speakers in the smaller images may be shown with lower quality video feed (e.g., to save on network and system resources). It is possible that when a non-speaking user becomes a new speaking user and transitions from being shown in the smaller image (with the lower quality video feed) to the larger image (with the higher quality video feed), there may be a time delay (e.g., 3-4 seconds) between when the new speaking user is shown in the larger image and when the lower quality video feed finally switches to the higher quality video feed. In some implementations, the delay may be shortened, e.g., by having the user that is beginning to speak (e.g., a computing device, such as the computing device being used by the user that is beginning to speak), make the preliminary determination (e.g., predictive determination) that the non-speaking user has transitioned (or may likely be chosen) to be the new speaking user (e.g., if the volume of the new speaking user is higher than the other current speaking user).

Figure 1:
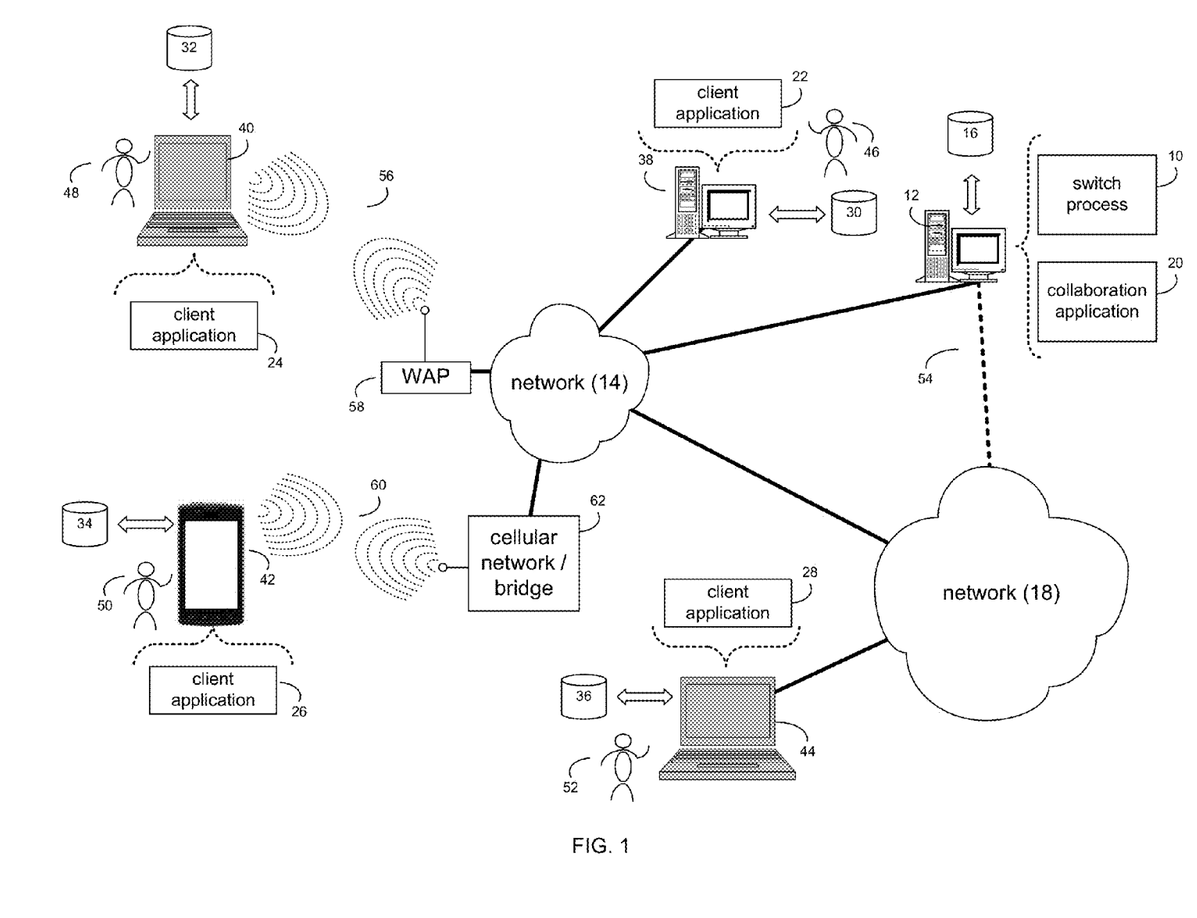
FIG. 1 is an illustrative diagrammatic view of a switch process coupled to a distributed computing network according to one or more implementations of the present disclosure.

Referring to FIG. 1, there is shown switch process 10 that may reside on and may be executed by a computer (e.g., computer 12), which may be connected to a network (e.g., network 14) (e.g., the internet or a local area network). Examples of computer 12 may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, a custom operating system.

As will be discussed below in greater detail, switch process 10 may send, by a first computing device, a video feed with a pre-determined quality level to a second computing device. The first computing device may determine that a volume level associated with the video feed reaches a threshold. The first computing device may send the video feed with a higher quality level to the second computing device based upon, at least in part, determining that the volume level associated with the video feed reaches the threshold.

The instruction sets and subroutines of switch process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, etc.) and may be located within any suitable memory location, such as storage device 16 coupled to computer 12. Any data described throughout may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Switch process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a collaboration application (e.g., collaboration application 20), examples of which may include, but are not limited to, e.g., a web conferencing application, a video conferencing application, a voice-over-IP application, a video-over-IP application, or other application that allows for virtual meeting and/or remote collaboration. Switch process 10 and/or collaboration application 20 may be accessed via client applications 22, 24, 26, 28. Switch process 10 may be a stand alone application, or may be an applet/application/script that may interact with and/or be executed within collaboration application 20. Examples of client applications 22, 24, 26, 28 may include, but are not limited to, e.g., a web conferencing application, video conferencing application, voice-over-IP application, a video-over-IP application, or other application that allow for virtual meeting and/or remote collaboration, a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, a custom operating system.

One or more of client applications 22, 24, 26, 28 may be configured to effectuate some or all of the functionality of switch process 10 (and vice versa). Accordingly, switch process 10 may be a purely server-side application, a purely client-side application, or a hybrid server-side/client-side application that is cooperatively executed by one or more of client applications 22, 24, 26, 28 and switch process 10.

One or more of client applications 22, 24, 26, 28 may be configured to effectuate some or all of the functionality of collaboration application 20 (and vice versa). Accordingly, collaboration application 20 may be a purely server-side application, a purely client-side application, or a hybrid server-side/client-side application that is cooperatively executed by one or more of client applications 22, 24, 26, 28 and collaboration application 20.

Users 46, 48, 50, 52 may access computer 12 and switch process 10 directly through network 14 or through secondary network 18. Further, computer 12 may be connected to network 14 through secondary network 18, as illustrated with phantom link line 54. Switch process 10 may include one or more user interfaces, such as browsers and textual or graphical user interfaces, through which users 46, 48, 50, 52 may access switch process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection.

Figure 2:
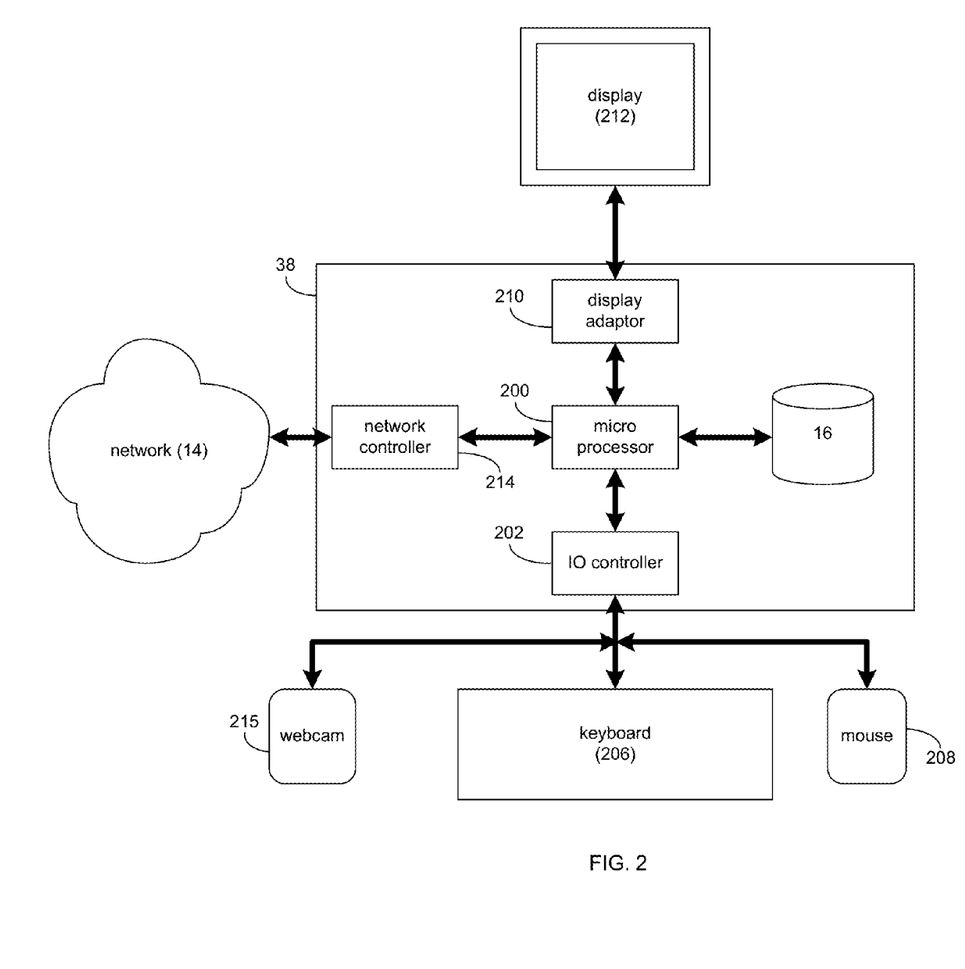
FIG. 2 is a diagrammatic view of a client electronic device of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configuration are possible. For example, any computing device capable of executing, in whole or in part, switch process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device 16. An I/O controller (e.g., I/O controller 202) may be configured to couple microprocessor 200 with various devices, such as keyboard 206, pointing/selecting device (e.g., mouse 208), custom device (e.g., webcam 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

As discussed above and referring also to FIGS. 3-5, switch process 10 may send 300, by a first computing device, a video feed with a pre-determined quality level to a second computing device. The first computing device (e.g., via switch process 10) may determine 302 that a volume level associated with the video feed reaches a threshold. The first computing device (e.g., via switch process 10) may send 304 the video feed with a higher quality level to the second computing device based upon, at least in part, determining that the volume level associated with the video feed reaches the threshold.

Figure 4:
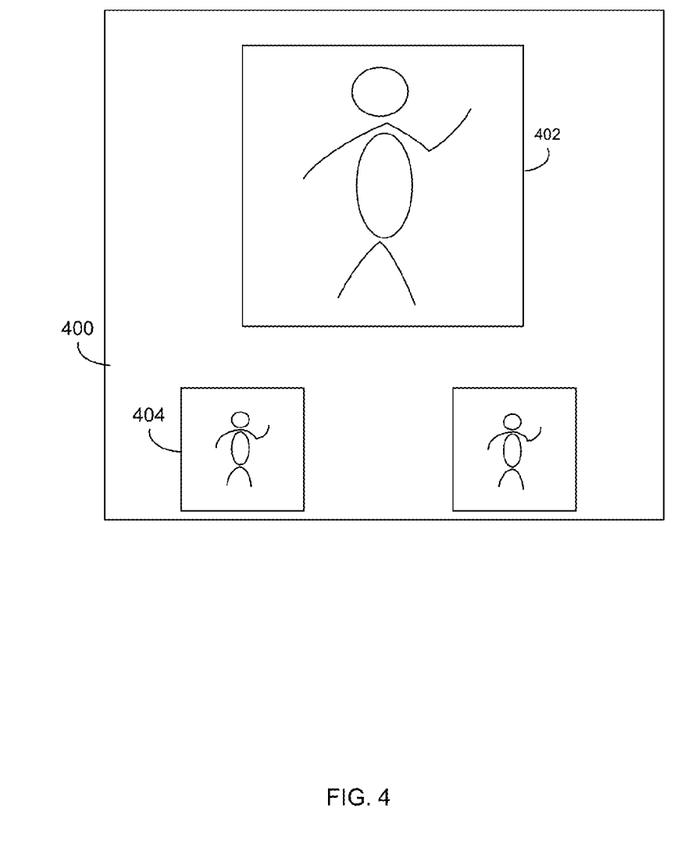
FIG. 4 is an illustrative diagrammatic view of a screen image displayed by the switch process of FIG. 1 according to one or more implementations of the present disclosure.

Assume for example purposes only the following scenario: Three participants (e.g., user 50, user 48, user 46) are in a video session (e.g., video chat session, video conferencing session, etc.). In the example, user 50 may currently be speaking and user 48 may have been the previous speaker. As discussed above, the focal point of the video session for a given user (e.g., the user that is speaking) may be on a main (e.g., larger) image (shown with higher quality video feed), while users that may not be speaking may be displayed in a smaller image (shown with lower quality video feed). An example user interface (e.g., UI 400) of, e.g., switch process 10 and/or one or more of the above-noted client applications is shown in FIG. 4, with main image 402, and one or more smaller images 404. Thus, in the example, user 48 and user 46 may have a higher resolution (e.g., higher fidelity via the higher quality video feed) for user 50, and user 50 may have a higher resolution for user 48 since, e.g., user 48 may have been the most recent speaker. Further in the example, when user 46 starts speaking, user 50 (e.g., via client electronic device 42) and user 48 (e.g., via client electronic device 40) may immediately switch user 46 to the larger image (but with lower fidelity) and may send a request that user 46 (e.g., via client electronic device 38) send a higher quality video. Additionally, in the example, user 50 and user 48 may immediately send a request that user 48 and user 50 respectively send the lower quality video. In the example, user 46 may continue to receive a higher quality video for user 50 who, in the example, is now the most recent speaker.

In the example, there may be a delay (e.g., 3-4 seconds) between when (1) user 46 is switched to the larger image for user 48 and user 50 (but with lower quality video), and (2) when the higher quality video of user 46 on the larger image is received and reflected in the larger image for user 48 and user 50. The above-noted delay may be due to, for instance, the time required for an indication that user 46 should be sending higher quality video to reach user 50 and/or user 48, plus the time required for either user 50 and/or user 48 to determine that user 46 should be sending higher quality video, plus the time required for either user 50 and/or user 48 to send a request back to user 46 to send higher quality video, plus the time required for that higher quality video to be received and reflected for either user 50 and/or user 48. It will be appreciated that the images of the respective users may all be rendered as the same size, irrespective of the quality of video being sent.

Figure 3:
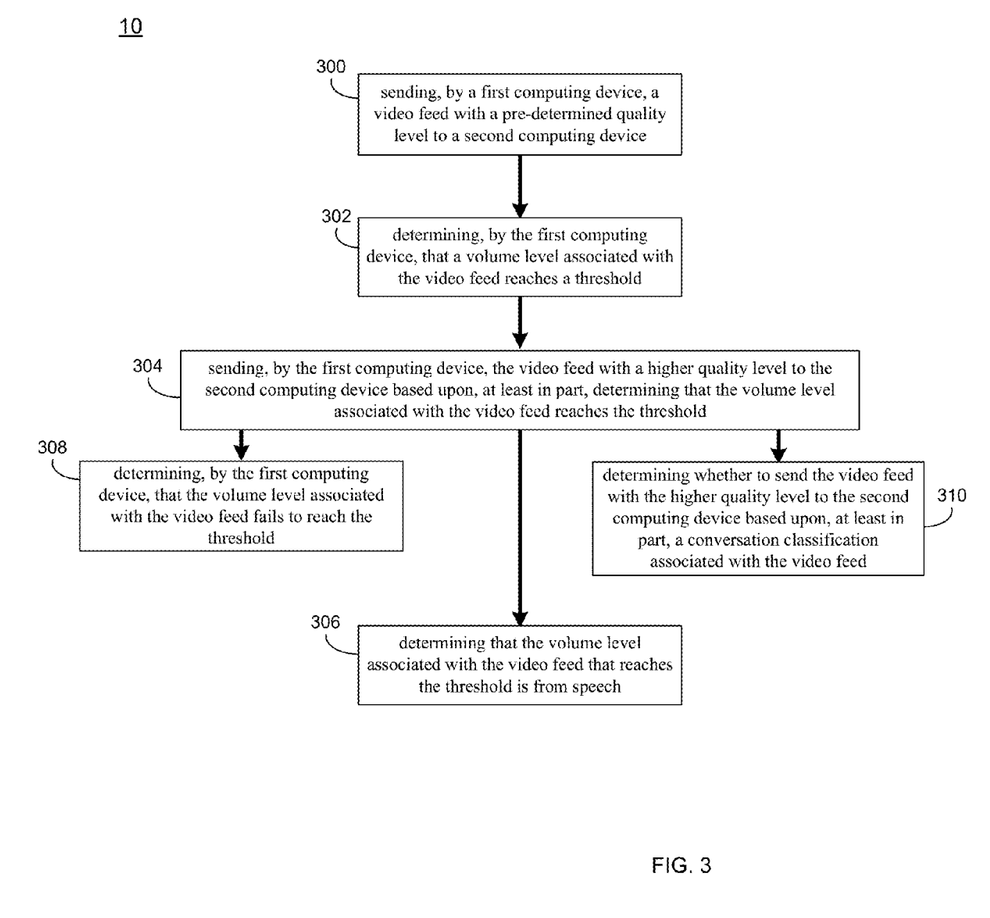
FIG. 3 is an illustrative flowchart of the switch process of FIG. 1 according to one or more implementations of the present disclosure.

In some implementations, to help reduce the above-noted delay, one or more of the above-noted time delays may be obviated. For example, assume that user 46 is in a video session (e.g., multiway video session) at least with user 48. In the example, switch process 10 (e.g., via client application 22 and/or collaboration application 20) may send 300, by a first computing device (e.g., client electronic device 38), a video feed with a pre-determined quality level (e.g., low resolution) to user 48 at a second computing device (e.g., client electronic device 40). An image capturing device (e.g., webcam 215) may be used by client electronic device 38 to capture one or more images (e.g., images of the video feed) of user 46 that is sent 300 to be displayed at client electronic device 40.

In some implementations, "low" resolution (e.g., low quality, low fidelity, etc.) may generally be described as a relative term. For instance, there may be at least two possible resolution levels capable of being applied to, e.g., an image being displayed. In the example, the image with the lower resolution level of the two resolution levels may be considered as having low resolution, whereas the image with the higher resolution level of the two resolution levels may be considered as having "high" resolution. However, this is a general example and should not be taken as limiting the scope of the disclosure. In some implementations, "resolution" may generally apply to pixel resolution, but may also include, but is not limited to, spatial resolution, spectral resolution, temporal resolution, and radiometric resolution.

Assume for example purposes only that client electronic device 38 (e.g., via switch process 10 and/or client application 22) uses, at least in part, volume to determine when and if user 46 is speaking. For example, client electronic device 38 may include an audio capturing device (e.g., microphone) that may or may not be included with webcam 215 to capture the audio portion associated with the above-noted video feed. In some implementations, client electronic device 38 (e.g., via switch process 10 and/or client application 22) may determine 302 that the volume level associated with the video feed reaches a threshold at a first point in time (e.g., when user 46 begins speaking). For instance, the threshold may include the volume level and/or range of volume levels typically associated with normal speaking volume. As an example, if user 46 is around three feet from the microphone, a "normal" conversation volume level may be around 60-62 dB, a raised voice level may be around 66-68 dB, a loud voice level may be around 72-74 dB, and shouting voice level may be around 78-80 dB.

Figure 5:
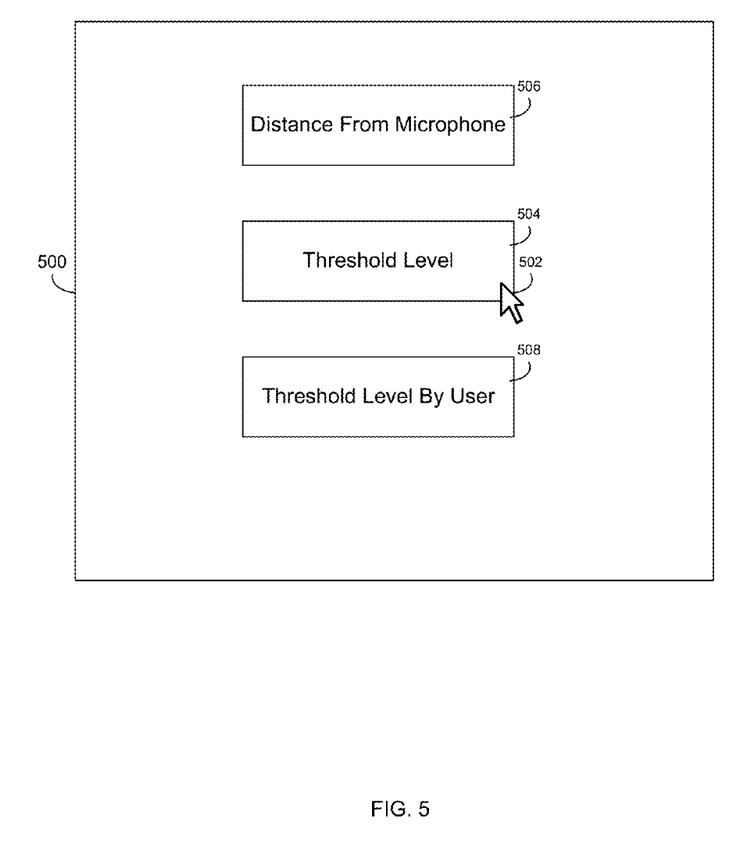
FIG. 5 is an illustrative diagrammatic view of a screen image displayed by the switch process of FIG. 1 according to one or more implementations of the present disclosure.

In some implementations, the threshold (e.g., default threshold) may be the normal conversation level as noted above. However, switch process 10 may, e.g., via a user interface (e.g., UI 500) of client application 22, enable user 46 to personalize the threshold level. For instance, user 46 may use (e.g., curser 502) to choose (e.g., input, select, etc.) the desired threshold, via a "Threshold Level" portion 504 of UI 500. In some implementations, user 46 may choose the distance that user 46 is expected to be from the microphone, e.g., via a "Distance From Microphone" portion 506 of UI 500, which may adjust the threshold. For example, the doubling of the distance of user 46 from the microphone may decrease the volume level of the audio from user 46 that reaches the microphone by, e.g., 6 dB. Thus, in the example, if user 46 chooses to be 6 feet from the microphone, switch process 10 may adjust (e.g., increase, decrease) the threshold by 6 dB.

The volume level of the audio that reaches the microphone may not be entirely from user 46 and may include, e.g., background noise, that may "trick" switch process 10 into determining 302 that the volume level associated with the video feed reaches the threshold. For example, user 46 may sneeze, which may cause a volume level to be greater than the threshold. In the example, switch process 10 (e.g., via client application 22) may include speech recognition abilities to identify that the volume level that is greater than the threshold is not from speech and therefore may not determine 302 the threshold as having been reached. However, in some implementations, the volume level associated with the video feed that reaches the threshold may be determined 306 (e.g., via switch process 10 and/or client application 22) to be from speech, in which case the threshold may be determined 302 to have reached the threshold. In some implementations, switch process 10 may use frequency domain analysis of incoming sounds to determine 306 whether the volume level associated with the video feed that reaches the threshold is from speech (e.g., a power drill may have different frequencies than vocal frequencies). In some implementations, temporal parameters (e.g., how quickly the volume level becomes "loud") may be used by switch process 10 to determine 306 whether the volume level associated with the video feed that reaches the threshold is from speech. For example, the speed at which the volume level may reach the threshold from banging on a desk may be different from the speed at which the volume level may reach the threshold from beginning to speak. Other classification mechanisms may also be used without departing from the scope of the disclosure. In some implementations, the above-noted "Threshold Level" portion 404 may be used to choose a threshold level range (e.g., 78-80 dB), such that volume outside of the range (e.g., from a sneeze) may not determine 302 the threshold as having been reached, whereas a volume inside of the range may case the determination 302 of the threshold as having been reached.

In some implementations, the threshold may include the volume level associated with the video feed of user 48 at client electronic device 40. The volume level associated with the video feed of user 48 may be determined by switch process 10 (e.g., via client application 26). For example, switch process 10 may (e.g., constantly and/or at pre-defined intervals) compare the volume level associated with the video feed of user 48 and the volume level associated with the video feed of user 46. In the example, if the threshold includes the volume level of user 48, switch process 10 may determine 302 (e.g., via client application 22) that the volume level has reached the threshold as user 46 has become the loudest speaker (e.g., louder than user 48). In the example, and as will be discussed below, switch process 10 (e.g., via client application 22) may thus pro-actively begin sending the higher video level quality from user 46 to user 48 (e.g., before being requested by client electronic device 40 and/or computer 12 to do so). Other techniques of assigning the threshold may also be used without departing from the scope of the disclosure. For example, the threshold may be a preference chosen by, e.g., user 46 to be applied to other users (e.g., user 48). This preference may be chosen, e.g., via a "Threshold Level By User" portion 508 of UI 500 For instance, user 48 may want higher video level quality to be sent from user 46 at, e.g., 56 dB and user 50 may be at a default threshold of 60 dB. As such, switch process 10 may apply the threshold of 56 dB specifically to user 48, and apply the threshold of 60 dB to user 50.

In some implementations, client electronic device 38 (e.g., via switch process 10 and/or client application 22) may send 304 the video feed with a higher quality level to client electronic device 40 based upon, at least in part, determining 302 that the volume level associated with the video feed reaches the threshold (e.g., as noted above). For example, if the threshold is reached at client electronic device 38, rather than waiting for the volume level associated with the video feed to reach client electronic device 40, and/or waiting for client electronic device 40 to determine that client electronic device 38 should be sending higher quality level video, and/or waiting for client electronic device 40 to send a request back to client electronic device 38 to send higher quality level video, client electronic device 38 (e.g., via switch process 10 and/or client application 22) may anticipate (e.g., predict) that reaching the threshold at client electronic device 38 may eventually result in client electronic device 40 requesting higher quality level video, and may preemptively (e.g., before receiving the request from client electronic device 40 and/or computer 12 to do so) send 304 to client electronic device 40 the video feed with the higher quality level.

In some implementations, client electronic device 38 (e.g., via switch process 10) may (e.g., via switch process 10 and/or client application 22) may determine 306 that the volume level associated with the video feed fails to reach the threshold. For instance, assume for example purposes only that the above-described threshold has been reached, e.g., at a first point in time, such as when user 46 begins speaking, causing client electronic device 38 to send 304 the higher quality level video to client electronic device 40. Further assume in the example that the determination 306 is made that the volume level associated with the video feed fails to reach the threshold at a second point in time (e.g., when user 46 stops speaking). In the example, the video feed with the pre-determined quality level (e.g., the lower quality level) may be sent 300 to client electronic device 40 based upon, at least in part, determining 306 that the volume level associated with the video feed fails to reach the threshold. The video feed with the pre-determined quality level may also be sent 300 to client electronic device 40 based upon, at least in part, determining 306 that the volume level associated with the video feed fails to reach the threshold before client electronic device 38 determines 302 that the volume level associated with the video feed reaches the threshold. The above-noted first and second point in time need not imply an order of events.

Continuing with the above-noted scenario, further assume the following:

User 46 is responding to a simple question, for example, user 50 may ask user 48, "today is the deadline, right user 46?", where user 46 responds, "yes", at which point user 50 continues talking. In this scenario user 48 (via client electronic device 40) may have switched from higher quality level video from user 50 to lower quality level video from user 46 (via client electronic device 38), to higher quality level video from user 46, to lower quality level video from user 50 to higher quality level video from user 50, etc. That is, the above-scenario may result in multiple switching with a poor user experience. In some implementations, switch process 10 may implement a delay before switching (e.g., implementing a 500 ms delay may result in precluding the switch from occurring). In some implementations, switch process 10 may adaptively model the video session conversation to reduce the unnecessary down switching during short back and forth conversations.

For example, in some implementations, the video feed with the pre-determined quality level (e.g., lower quality level video) may be sent 300 to client electronic device 40 based upon, at least in part, determining 306 by client electronic device 38 (e.g., via switch process 10 and/or client application 22) that the volume level associated with the video feed fails to reach the threshold after a length of time. In some implementations, the length of time may include a length of time that the volume level associated with the video feed reaches the threshold. For instance, assume for example purposes only that switch process 10 implements a maximum time decay of (e.g., 10 seconds), such that if user 46 starts speaking (and reaches the above-noted threshold), then for 10 seconds, user 48 (via client electronic device 40) may receive both video feeds of user 50 and user 46 in higher quality level video. Further assume that if user 46 continues speaking, then after 10 seconds the decay on the video feeds of user 50 may be empty and the video feed of user 50 may be downgraded to the lower quality level video. Continuing with the above example, if user 46 only responded with a short response, then focus may return to user 50 with higher quality level video and user 46 may decay for a minimum of, e.g., 10 seconds. In some implementations, if user 46 only responded with a short response, then focus may return to user 50 with higher quality level video and user 46 may decay for a minimum of the length of time that user 46 spoke. In some implementations, if user 46 only responded with a short response, then focus may return to user 50 with higher quality level video and user 46 may decay for a minimum of a scaled down length of time that user 46 spoke. For example, with an example 10% scale down, if user 46 spoke for 1 minute, the scaled down length of time may be 6 seconds.

In some implementations, switch process 10 may implement a ramp up time and a decay time. The ramp up time may prevent a large additional bandwidth load when a single noisy (e.g., with a volume above the threshold) participant is present. For example, if user 46 is making noisy 1 second interruptions, then switch process 10 may only send higher quality level video of user 46 for 1 second.

In some implementations, switch process 10 may determine 310 whether to send the video feed with the higher quality level to client electronic device 40 based upon, at least in part, a conversation classification associated with the video feed. For example, a learning model may be applied by switch process 10 to understand the past behavior within a given conversation. For instance, switch process 10 may classify a conversation as, e.g., a back-and-forth conversation between 2 or more users, such that, for example, high or low quality level video of each user is always sent. As another example, switch process 10 may classify a conversation as, e.g., a roundtable conversation (e.g., where each user may give a 5 minute update), such that, for instance, the quality level of the video may be adjusted per user after 5 minutes (plus or minus some allotted time). As another example, switch process 10 may classify a conversation as, e.g., a presentation with a single dominant speaker, such that higher quality level video of the dominant speaker is always sent, and lower quality level video of the other participants is always sent. Each of these classification (as well as others) may be dynamically adjusted by switch process 10 and/or chosen by a user (e.g., via UI 500). In some implementations, user 46 may (e.g., via switch process 10 and/or client application 22) override the decision to send or not to send a particular quality of video.

In some implementations, switch process 10 may delay rendering the higher quality level video, e.g., until the higher quality level video is received. For instance, assume that it is determined 304 at client electronic device 38 that the volume level associated with the video feed has reached the threshold and thus the higher quality level video is being sent 304 to client electronic device 40. In the example, even though client electronic device 40 may have determined that the threshold has been reached, switch process 10 (e.g., via client application 24) may delay rendering user 46 in the above-noted larger image until the higher quality level video sent 304 from client electronic device 38 is received at client electronic device 40. Switch process 10 may delay rendering the higher quality level video until other milestones are met without departing from the scope of the disclosure. The above-noted milestone of client electronic device 40 receiving the higher quality level video (as well as other milestones) before rendering the higher quality level video may be chosen by a user (e.g., via UI 500).

The present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
    sending, by a first computing device participating in a multiway video session, a video feed with a low resolution to a second computing device participating in the multiway video session;
    determining, by the first computing device, that a volume level associated with the video feed reaches a threshold indicative of a user of the first computing device being a primary speaker in the multiway video session; and
    in response to determining that the volume level associated with the video feed has reached the threshold, sending, by the first computing device, the video feed with a high resolution to the second computing device.

2. A computer-implemented method comprising:
    sending, by a first computing device, a video feed with a pre-determined quality level to a second computing device, the video feed being part of a multiway video session;
    determining, by the first computing device, that a volume level associated with the video feed reaches a threshold indicative of a user of the first computing device being a primary speaker in the multiway video session; and
    in response to determining that the volume level associated with the video feed has reached the threshold, sending, by the first computing device, the video feed with a higher quality level to the second computing device.

3. The computer-implemented method of claim 2 further comprising determining, by the first computing device, that the volume level associated with the video feed fails to reach the threshold.

4. The computer-implemented method of claim 3 wherein the video feed with the pre-determined quality level is sent to the second computing device based upon, at least in part, determining that the volume level associated with the video feed fails to reach the threshold.

5. The computer-implemented method of claim 3 wherein the video feed with the pre-determined quality level is sent to the second computing device based upon, at least in part, determining that the volume level associated with the video feed fails to reach the threshold after a length of time.

6. The computer-implemented method of claim 5 wherein the length of time includes a length of time that the volume level associated with the video feed reaches the threshold.

7. The computer-implemented method of claim 2 wherein determining that the volume level associated with the video feed reaches the threshold is based on speech input by the user at the first computing device.

8. The computer-implemented method of claim 2 further comprising determining whether to send the video feed with the higher quality level to the second computing device based upon, at least in part, a conversation classification associated with the video feed.

9. A computing system including a processor and a memory configured to perform operations comprising:
    sending, by a first computing device, a video feed with a pre-determined quality level to a second computing device, the video feed being part of a multiway video session;
    determining, by the first computing device, that a volume level associated with the video feed reaches a threshold indicative of a user of the first computing device being a primary speaker in the multiway video session; and
    in response to determining that the volume level associated with the video feed has reached the threshold, sending, by the first computing device, the video feed with a higher quality level to the second computing device.

10. The computing system of claim 9 further comprising determining, by the first computing device, that the volume level associated with the video feed fails to reach the threshold.

11. The computing system of claim 10 wherein the video feed with the pre-determined quality level is sent to the second computing device based upon, at least in part, determining that the volume level associated with the video feed fails to reach the threshold.

12. The computing system of claim 10 wherein the video feed with the pre-determined quality level is sent to the second computing device based upon, at least in part, determining that the volume level associated with the video feed fails to reach the threshold after a length of time.

13. The computing system of claim 12 wherein the length of time includes a length of time that the volume level associated with the video feed reaches the threshold.

14. The computing system of claim 9 wherein determining that the volume level associated with the video feed reaches the threshold is based on speech input by the user at the first computing device.

15. The computing system of claim 9 further comprising determining whether to send the video feed with the higher quality level to the second computing device based upon, at least in part, a conversation classification associated with the video feed.

16. A computer program product residing on a non-transitory computer readable storage medium having a plurality of instructions stored thereon which, when executed by a processor, cause the processor to perform operations comprising:
    sending, by a first computing device, a video feed with a pre-determined quality level to a second computing device, the video feed being part of a multiway video session;
    determining, by the first computing device, that a volume level associated with the video feed reaches a threshold indicative of a user of the first computing device being a primary speaker in the multiway video session; and
    in response to determining that the volume level associated with the video feed has reached the threshold, sending, by the first computing device, the video feed with a higher quality level to the second computing device.

17. The computer program product of claim 16 further comprising determining, by the first computing device, that the volume level associated with the video feed fails to reach the threshold.

18. The computer program product of claim 17 wherein the video feed with the pre-determined quality level is sent to the second computing device based upon, at least in part, determining that the volume level associated with the video feed fails to reach the threshold.

19. The computer program product of claim 17 wherein the video feed with the pre-determined quality level is sent to the second computing device based upon, at least in part, determining that the volume level associated with the video feed fails to reach the threshold after a length of time.

20. The computer program product of claim 19 wherein the length of time includes a length of time that the volume level associated with the video feed reaches the threshold.

\* \* \* \* \*